United States Patent
Akiyama et al.

(10) Patent No.: US 8,478,089 B2
(45) Date of Patent: Jul. 2, 2013

(54) OPTICAL SWITCH AND OPTICAL-SWITCH CONTROL METHOD

(75) Inventors: Yuji Akiyama, Tokyo (JP); Takashi Mizuochi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 244 days.

(21) Appl. No.: 13/040,840

(22) Filed: Mar. 4, 2011

(65) Prior Publication Data

US 2011/0217000 A1     Sep. 8, 2011

(30) Foreign Application Priority Data

Mar. 8, 2010   (JP) .................................. 2010-050974

(51) Int. Cl.
  *G02B 6/26*     (2006.01)
  *G02B 6/42*     (2006.01)

(52) U.S. Cl.
  USPC ............................................. 385/16; 385/15

(58) Field of Classification Search
  USPC .......................................................... 385/16
  See application file for complete search history.

(56) References Cited

U.S. PATENT DOCUMENTS

| | | | |
|---|---|---|---|
| 5,555,243 A | | 9/1996 | Kakuma et al. |
| 5,892,864 A | * | 4/1999 | Stoll et al. ........................ 385/17 |
| 6,259,834 B1 | * | 7/2001 | Shani ............................... 385/17 |
| 7,050,668 B2 | * | 5/2006 | Kumaran et al. ................ 385/17 |
| 2011/0217000 A1 | * | 9/2011 | Akiyama et al. ................ 385/16 |

FOREIGN PATENT DOCUMENTS

| | | |
|---|---|---|
| CN | 1318910 A | 10/2001 |
| CN | 1556426 A | 12/2004 |
| JP | 1-202942 A | 8/1989 |
| JP | 9-247088 A | 9/1997 |
| JP | 2004-246302 | 9/2004 |

OTHER PUBLICATIONS

Office Action issued Oct. 8, 2012, in Chinese Patent Application No. 201110053583.0.

* cited by examiner

*Primary Examiner* — Rhonda Peace
(74) *Attorney, Agent, or Firm* — Oblon, Spivak, McClelland, Maier & Neustadt, L.L.P.

(57) ABSTRACT

An optical switch according to the present invention includes a multiple-stage optical-switch unit that includes one input port and a plurality of output ports that are configured by connecting multiple stages of optical switching elements each of which includes three or more optical input-output ports; and a switching control circuit that, when receiving a switching instruction to switch an output destination of light input from the input port, executes at first a first control that changes setting of an optical switching element that is included in part not overlapping with an optical transmission channel reaching an optical output port before switching in an optical transmission channel reaching an optical output port after switching and is positioned at a point other than a branch point from an overlapping part, and then executes a second control that changes setting of an optical switching element that is positioned at the branch point.

5 Claims, 5 Drawing Sheets

OPTICAL SWITCH AND OPTICAL-SWITCH CONTROL METHOD

BACKGROUND OF THE INVENTION

1. Field of the Invention

The present invention relates to an optical switch configured by connecting multiple stages of optical switching elements each of which switches an optical transmission channel.

2. Description of the Related Art

As an example of a conventional optical switch, there is an optical switch that is described in Japanese Patent Application Laid-open No. 2004-246302. The optical switch is configured to avoid destroying an optical signal that is conducting when switching the output destination of an optical signal, and to output the optical signal to each of optical waveguides before and after the switching while switching the output destination.

However, according to an optical-switch switching-control circuit disclosed in the paten document No. 2004-246302, it is considered to avoid destroying an optical signal that is conducting; but cannot avoid crosstalk that an optical signal temporarily interferences into a switching channel that is irrelevant to switching at the moment of the switching. As a result, where the above conventional optical switch is applied to switching of the transmission channel of an optical communication signal and when crosstalk occurs at the moment of the switching, there is a problem such that an optical communication signal under the switching is leaked into a switching channel irrelevant to the switching, and confidentiality of communication contents cannot be maintained.

Moreover, there is another problem that when a switching channel irrelevant to the switching is coupled downstream of the switching to another optical transmission channel in operation by using an optical coupler, crosstalk light destroys an optical signal in the optical transmission channel in operation, and causes a communication trouble.

The present invention has been made in the light of the above, and an object of the present invention is to obtain an optical switch and an optical-switch control method according to which crosstalk dose not occur when switching an optical transmission channel.

SUMMARY OF THE INVENTION

It is an object of the present invention to at least partially solve the problems in the conventional technology.

An optical switch according to an aspect of the present invention, includes: a multiple-stage optical-switch unit that includes one input port and a plurality of output ports that are configured by connecting multiple stages of optical switching elements each of which includes three or more optical input-output ports, and a switching control unit that, when receiving a switching instruction to switch an output destination of light input from the input port, executes at first a first control that changes setting of an optical switching element that is included in part not overlapping with an optical transmission channel reaching an output port before switching in an optical transmission channel reaching an output port after switching and is positioned at a point other than a branch point from an overlapping part, and then executes a second control that changes setting of an optical switching element that is positioned at the branch point.

An optical-switch control method according to an aspect of the present invention when changing an output destination of input light by an optical switch that includes one input port and a plurality of output ports that are configured by connecting multiple stages of optical switching elements each of which includes three or more optical input-output ports, includes: comparing a first optical transmission channel reaching a current output port from an input port with a second optical transmission channel reaching a new output port after changing from the input port, when receiving a switching instruction to switch an output destination of light input from the input port, and controlling optical switching elements by executing a first control that changes setting of an optical switching element that is included in part not overlapping with the first optical transmission channel in the second optical transmission channel based on a comparison result by the comparing, and is positioned at a point other than a branch point from an overlapping part, and then executing a second control that changes setting of an optical switching element that is positioned at the branch point.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical switch and a control method of the optical switch according to the present invention will be explained below in detail with reference to the accompanying drawings. However, the present invention is not limited by the embodiments.

First Embodiment

An optical switch according to an embodiment of the present invention includes four or more external optical ports that input or output light and a plurality of optical switching elements each of which includes, for example, three or more internal optical ports that input or output light, and switches the optical transmission channel among the internal optical ports when receiving input of an element-switching control signal that gives an instruction to switch the optical transmission channel among the internal optical ports; and structures a multiple-stage optical switch by appropriately connecting the internal optical ports and the external optical ports. Moreover, the optical switch includes a switching control circuit that appropriately controls order and timing of switching of each optical switching element in accordance with a connection specifying signal that specifies connective relation between the external optical ports; and the switching control circuit outputs to the multiple-stage optical switch an element-switching control signal that controls the optical switching elements not to cause crosstalk. Accordingly, it can switch the optical transmission channel without leaking an optical communication signal under the switching into a switching channel irrelevant to the switching, nor destroying an optical communication signal in an optical transmission channel in operation with crosstalk light, thereby achieving maintenance of confidentiality of communication contents and prevention of communication trouble occurrence. This optical switch is explained below in detail.

Figure 1:
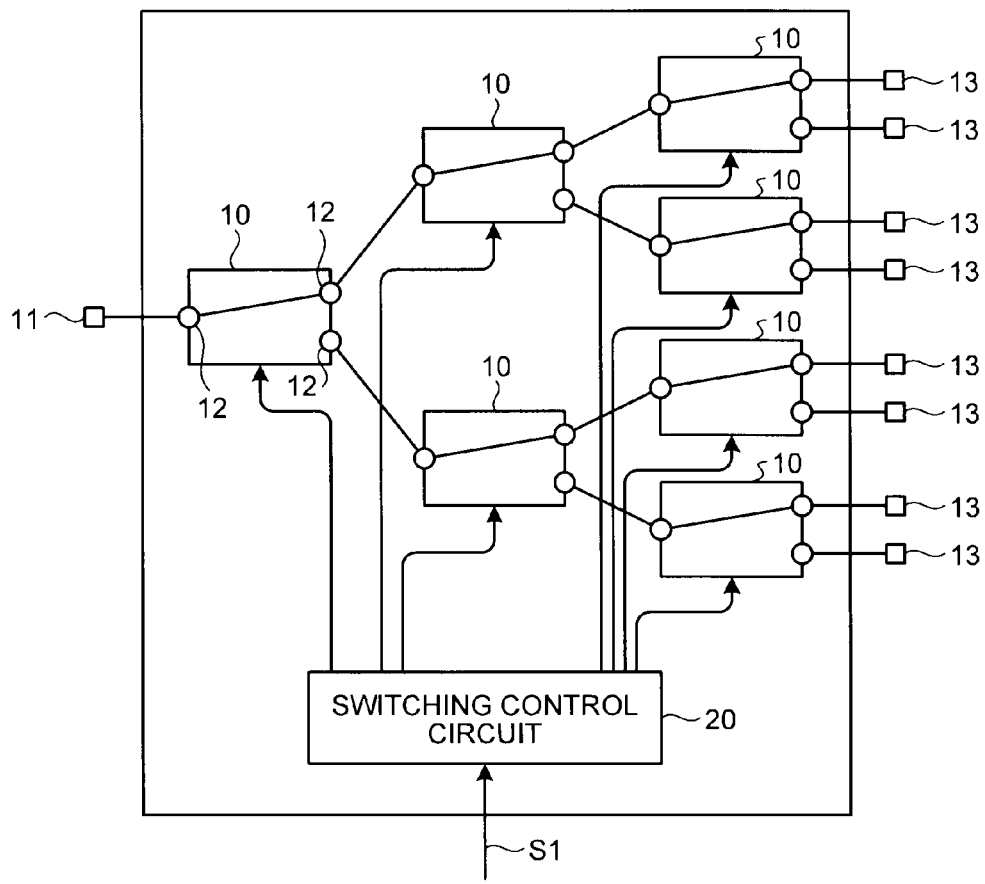
FIG. 1 is a schematic diagram that depicts a configuration example of an optical switch according to an embodiment of the present invention.

FIG. 1 is a schematic diagram that depicts a configuration example of an optical switch according to a first embodiment of the present invention. The same component or a component that can be considered as the same component (a component that executes a similar operation) is assigned with the same reference numeral in each figure used in explanations of each embodiment.

As shown in FIG. 1, the optical switch according to the embodiment includes a plurality of optical switching elements 10 and a switching control circuit 20, and the optical switching elements 10 structures a multiple-stage optical switch by connecting them in multiple stages. Each of the optical switching elements 10 is a 2×1 optical switching element, includes three optical input-output ports 12 corresponding to the internal optical ports described above (hereinafter, simply described as "the optical ports 12"), and outputs an optical signal input from one of the optical ports 12 from one of the rest of the optical ports 12. Moreover, the optical switching elements 10 in the first stage and the final stage are connected to an optical input port 11 and optical output ports 13, respectively, corresponding to the external optical ports described above. The switching control circuit 20 controls each of the optical switching elements 10 in accordance with a connection-specifying signal S1 that is input from the outside, and sets a transmission channel of an optical signal (a transmission channel inside the multiple-stage optical switch) so as to output an optical signal input from the optical input port 11 from a desired one of the optical output ports 13 (the optical output port 13 instructed by the connection-specifying signal S1).

Between a not-shown external optical device, for example, an optical fiber transmission line, an optical multiplexer and demultiplexer, or an optical amplifier, and an external optical port (the optical input port 11 or the optical output port 13), between an external optical ports and an internal optical port, and between an internal optical port and an internal optical port are optically connected with, for example, an optical fiber cable; while between a not-shown external control monitor, for example, a device-control monitoring card or an operator control panel, and a switching control circuit, and between a switching control circuit and an optical switching element are electrically connected with, for example, a printed circuit board or a conductor.

Figure 2:
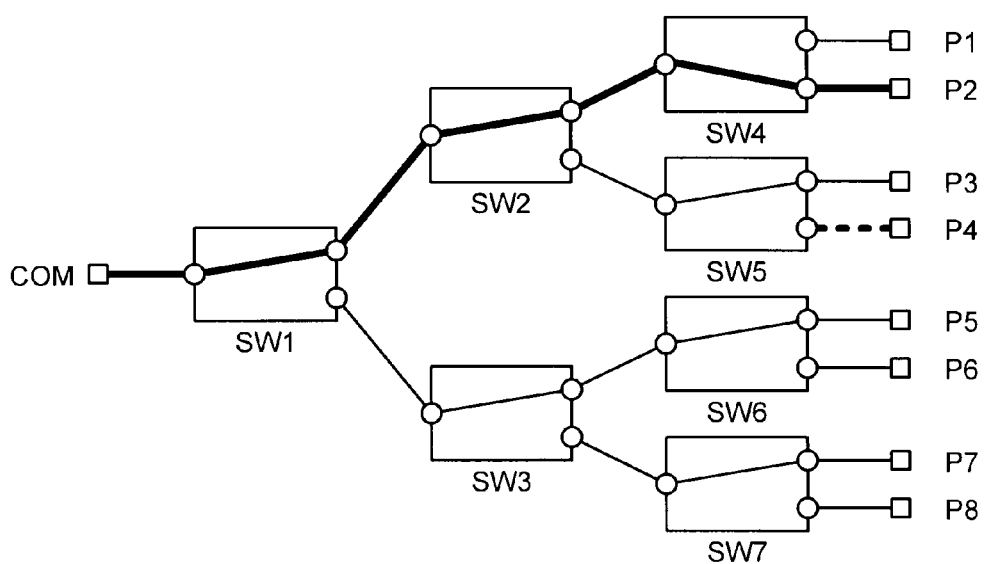
FIG. 2 is a schematic diagram for explaining operation of the optical switch according to the embodiment.
Figure 3:
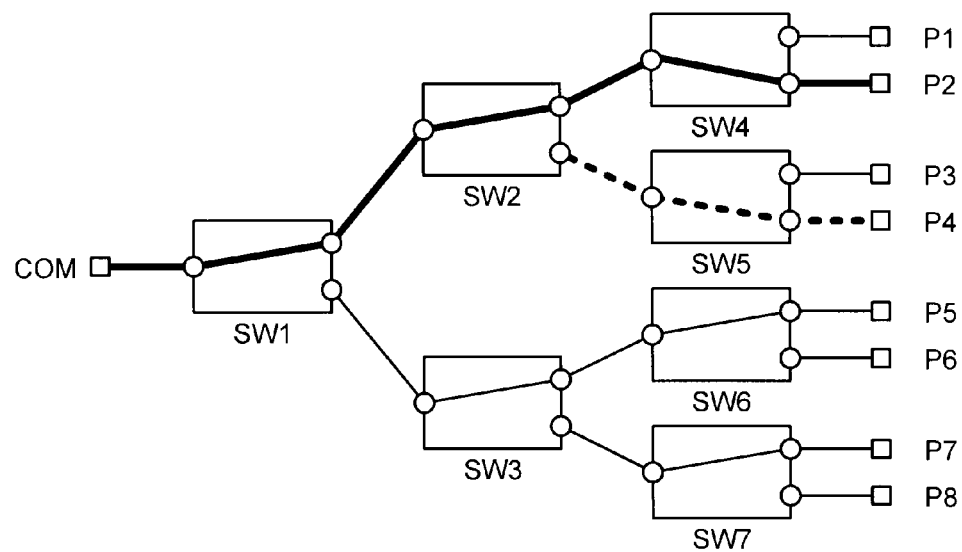
FIG. 3 is a schematic diagram for explaining operation of the optical switch according to the embodiment.
Figure 4:
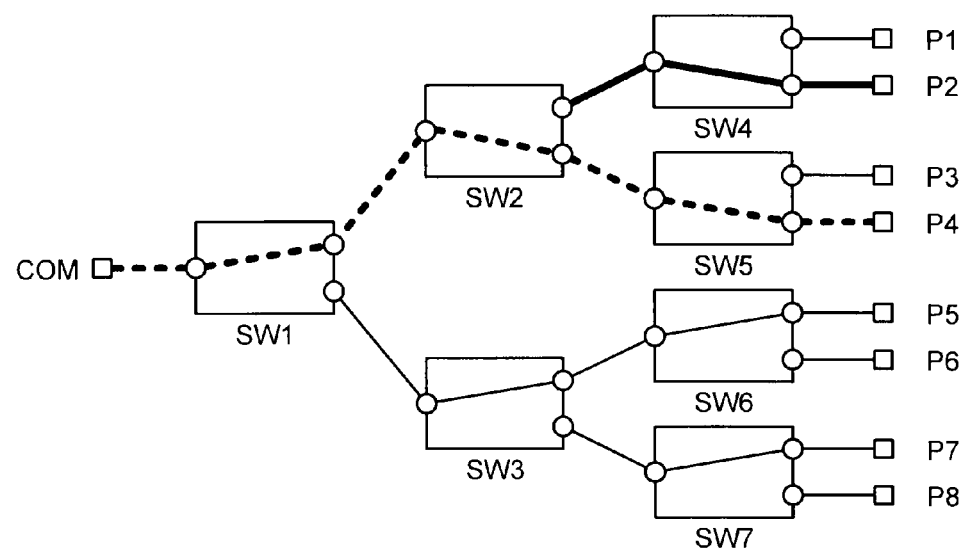
FIG. 4 is a schematic diagram for explaining operation of the optical switch according to the embodiment.

FIGS. 2, 3 and 4 are schematic diagrams for explaining operation of the optical switch with the above configuration. COM, SW1 to SW7, and P1 to P8 in FIGS. 2 to 4, correspond to the optical input port 11, the optical switching elements 10, and the optical output ports 13, respectively. A circuit that controls SW1 to SW7 (corresponding to the switching control circuit 20 described above) is not shown in the drawings. Seven 2×1 optical switching elements of SW1 to SW7 are optically connected one another between internal optical ports in tree, and internal optical ports not connected to any other optical switching element are connected to external optical ports, thereby structuring, in this example, an 8×1 multiple-stage optical switch as a whole.

Detailed operations of the optical switch are explained below. Here, operation in a case of switching the output destination of an input optical signal from P2 to P4 is explained below as an example. FIG. 2 depicts an initial state; between COM and P2, which are external optical ports, are connected in the initial state, and a part traced from the P2 side in the optical transmission channel is depicted with a thick solid line. Moreover, a part traced from the P4 side to be an output destination after switching is depicted with a thick broken line. A switching procedure from this state is as follows.

To begin with, as a first step, as shown in FIG. 3, the optical switching elements other than the optical switching element SW2 to be a branch point between the external optical port P4 as the destination of switching and the optical transmission channel in the initial state (the optical transmission channel before switching) are switched to the side of the optical transmission channel of the destination of switching. According to the case of the example in FIG. 3, the optical switching element SW5 is to be switched. During the switching operation in the first step, switching states of the optical switching elements included in the optical transmission channel in the initial state are not changed, therefore, the transmission state of light is not changed and dynamic crosstalk does not occur, regardless of transient properties of individual elements during optical switching element switching.

Then, as a second step, as shown in FIG. 4, the optical switching element SW2 to be the branch point between the external optical port P4 as the destination of switching and the optical transmission channel in the initial state is switched to the side of the external optical port of the destination of switching. The second step is started after the switching operation in the first step is completed and the connection state of each optical switching element is stabilized. The start timing (timing at which the switching control circuit 20 shown in FIG. 1 starts the control in the second step) can be configured to be determined based on a monitoring result of each of the optical switching elements 10 (SW1 to SW7) by an external control monitor (for example, a control monitoring card), or can be a time point at which a certain time (a time that is determined by considering a time required to change setting of each of the optical switching elements 10) has elapsed after the control in the first step is executed. Moreover, it can be configured such that the optical switching elements 10 notify the switching control circuit 20 of completion of setting change when the setting change is completed, and the switching control circuit 20 starts the control in the second step after receiving the notice of the completion of the setting change from all of the optical switching elements 10 that are instructed in the first step.

Because a control target of switching in the second step is only the optical switching element to be the branch point between the external optical port of the destination of switching and the optical transmission channel in the initial state, regardless of transient properties of individual elements during optical switching element switching, no influence on the transmission state of light occurs onto the optical ports other than the external optical ports COM and P2 as the optical transmission channel in the initial state and the external optical port P4 as the destination of switching. Therefore, dynamic crosstalk dose not occur into optical port irrelevant to switching. On the other hand, as a transient property of individual elements during optical switching element switching, a phenomenon that light is transmitted across a plurality of optical ports during switching, and/or a phenomenon that the switching state is not stabilized promptly and the connection state temporarily turns back from the destination of switching to the previous destination of switching, sometimes occur in some cases. However, even if the optical switching element to be the branch point between the external optical port of the destination of switching and the optical transmission channel in the initial state has such property that is not optimal as a optical switching element, its influence can be limited within the optical transmission channel in the initial state and the optical transmission channel of the destination of switching.

In this way, when switching the optical transmission channel, the optical switch according to the embodiment is configured to change at first setting of other than the optical switching element positioned at the branch point between the channel before switching and the channel after switching inside the switch, and then to change setting of the optical switching element positioned at the branch point. Accordingly, it can prevent crosstalk from occurring when switching an output destination of an input light (when switching the optical transmission channel inside the device), and maintenance of confidentiality of communication contents and prevention of communication trouble occurrence can be achieved.

Second Embodiment

Subsequently, an optical switch according to a second embodiment of the present invention is explained below. An internal configuration is similar to that of the optical switch according to the first embodiment (see FIG. 1).

According to the optical switch explained in the first embodiment, when switching the optical transmission channel, setting is changed through two steps; however, when it is configured to perform operation as described below, the switching control circuit can be simplified.

Figure 5:
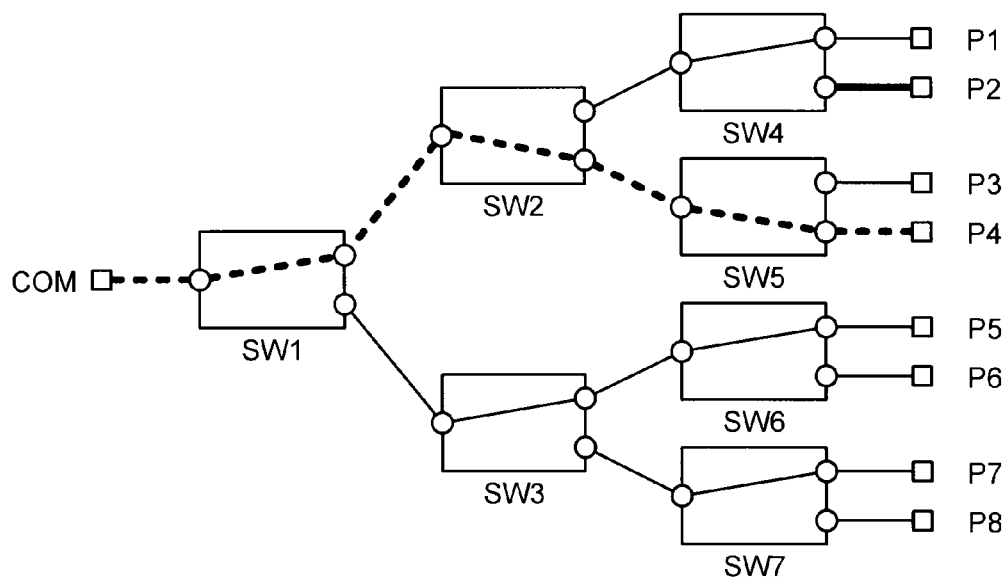
FIG. 5 is a schematic diagram for explaining operation of the optical switch according to the embodiment.

FIG. 5 is a schematic diagram for explaining operation of the optical switch according to the embodiment; and depicts an example of operation to be executed after executing the setting change operation in two steps explained in the first embodiment.

In other words, as a third step after the optical switch according to the embodiment changes setting of the optical switching elements 10 by executing the operation explained in the first embodiment, and then the change of the internal optical transmission channel is finished; the optical switch further switches the optical switching elements 10 that are not included in the optical transmission channel of the destination of the switching (in this example, SW3, SW4, SW6, and SW7, which are not included in the channel reaching P4 from COM), to a predetermined specific direction, as shown in FIG. 5. More specifically, the optical switch switches the optical switching element 10 that has departed from the optical transmission channel because the optical transmission channel is changed (SW4 in this example), to a specific direction. Accordingly, a switching state of each optical switching element after a series of switching steps are finished is uniquely determined in accordance with a connection state between the external optical ports, so that the configuration of the switching control circuit 20 and its design verification can be simplified.

In a case of not performing the switching of the third step, a switching state of each optical switching element is determined in accordance with a switching history in the past or an initial state at the start of use in addition to the current connection state among the ports, so that the number of states available for the multiple-stage optical switch (each of the optical switching elements 10) to take increases to a large extent, and the design verification turns complicated; on the other hand, the number of times of switching the switching elements and the number of sequence steps can be decreased, therefore, a desirable method can be selected in accordance with a destination of an application. For example, when the number of the optical switching elements 10 is less than a certain number, it is configured not to perform switching in the third step.

In this way, additionally to the operation to be executed by the optical switch according to the first embodiment, the optical switch according to the embodiment is configured further to set the state of the optical switching elements 10 not included in the optical transmission channel to a predetermined state. Accordingly, the configuration of the switching control circuit 20 and its design verification can be simplified.

Third Embodiment

Figure 6:
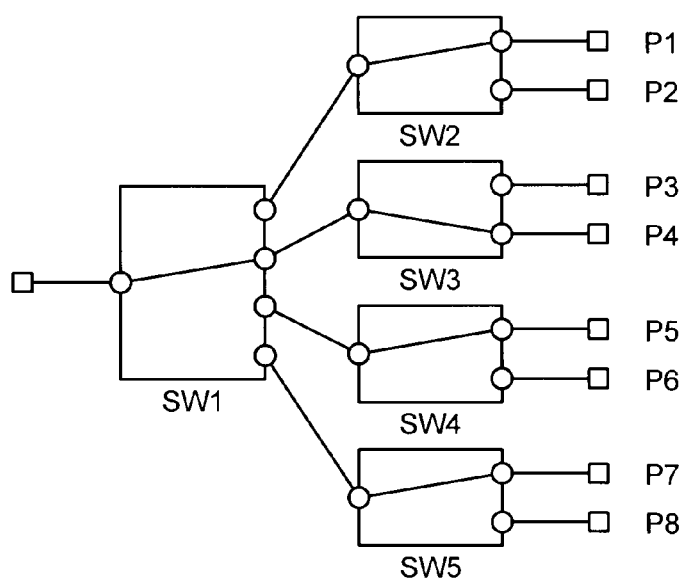
FIG. 6 is a schematic diagram that depicts a configuration example of an optical switch according to a third embodiment of the present invention.

FIG. 6 is a schematic diagram that depicts a configuration example of an optical switch according to a third embodiment of the present invention, and depicts a modification of the optical switch explained in the first and the second embodiments. Although the optical switch according to first and the second embodiments structures a multiple-stage optical switch with the optical switching elements 10 of the 2×1 type (see, for example, FIG. 1), part of the optical switching elements 10 can be replaced with other optical switching elements (for example, an optical switching element of the 4×1 type), as shown in FIG. 6. All of the optical switching elements 10 can be optical switching elements other than the 2×1 type. Optical switching elements of three or more types can be used in combination.

A procedure of switching the output port of an input optical signal (optical transmission channel) is similar to the procedure described in the first or the second embodiment. Setting of optical switching elements downstream of a branch point between the channel before switching and the channel after switching (on the side of the output port) is changed at first (corresponding to the operation at the first step described above); and then setting of the optical switching element at the branch point is changed (corresponding to the operation at the second step described above). Moreover, the setting state of optical switching elements not included in the optical transmission channel is changed (corresponding to the operation at the third step described above), as required. Also in such case, an effect similar to that by the optical switch according to the first or the second embodiment can be obtained.

In this way, the optical switch according to the embodiment is configured to include optical switching elements of a type different from the 2×1 type in part or all of its optical switching elements. Also in a case where such configuration is employed, it can prevent crosstalk from occurring when switching the optical transmission channel, similarly to the optical switch explained in the former embodiments.

Fourth Embodiment

Subsequently, an optical switch according to a fourth embodiment of the present invention is explained below. An internal configuration of the optical switch according to the embodiment is similar to that of the optical switch according to the first embodiment (see FIG. 1). The embodiment explains below in detail the switching control circuit 20 included in the optical switches described in the first to the third embodiments.

Figure 7:
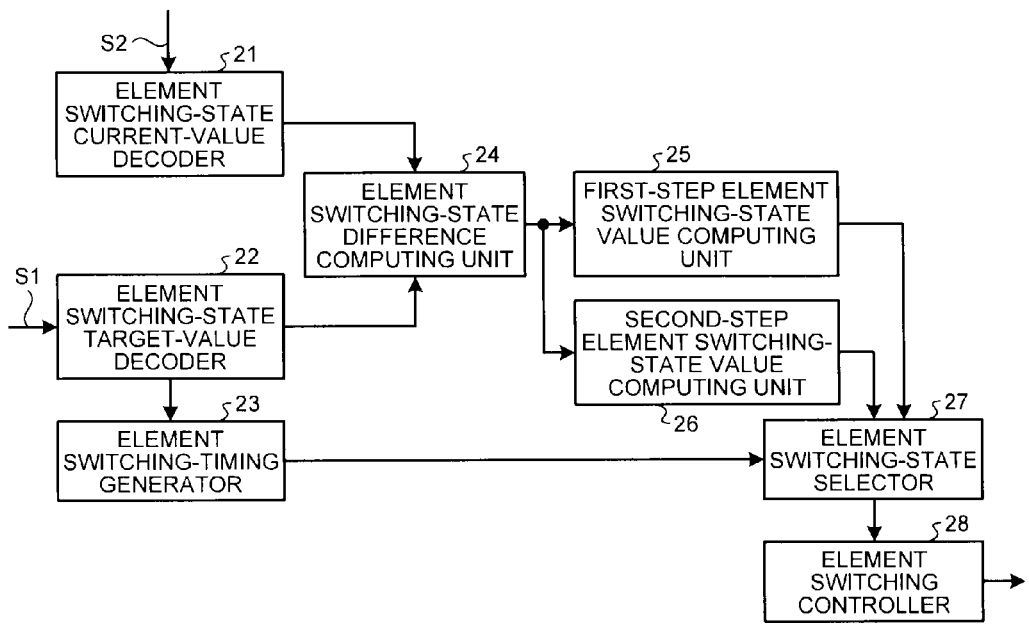
FIG. 7 is a schematic diagram that depicts a configuration example of a switching control circuit.

FIG. 7 is a schematic diagram that depicts a configuration example of the switching control circuit 20. The switching control circuit 20 shown in FIG. 7 uses the connection-specifying signal S1 and an element-switching monitoring signal S2 as input signals from the outside, and controls each of the optical switching elements 10 based on the input signals. Moreover, element switching timing is autonomously created by using the connection-specifying signal S1 as a trigger. The connection-specifying signal S1 is, for example, a signal that is output from an operator control panel that is an external control monitor. Moreover, the element-switching monitoring signal S2 can be a signal that is derived from a contact point for switching state monitoring of a mechanical optical switch; a signal that is derived from an element for temperature monitoring of a thermostat switch; more generally, a signal that is derived from an arbitrary monitoring target appropriate to each optical-switch device, such as voltage, current, temperature, time point, optical power, or mechanism position; moreover, a signal that is derived from a device or system to which the switch according to the embodiment of the present invention is applied, such as a conducting state of a main signal passing through a hardware or software control monitoring timer of a device-control monitoring card that is an external control monitor, or a related optical switch; and can be a signal derived from any information provided that it is a signal from which a switching state of the optical switch can be obtained directly or indirectly. A signal is not necessarily a signal that is autonomously created, and can be a signal that is output in accordance with a request by a period monitor.

The switching control circuit 20 shown in FIG. 7 includes an element switching-state current-value decoder 21, an element switching-state target-value decoder 22, an element switching-timing generator 23, an element switching-state difference computing unit 24, a first-step element switching-state value computing unit 25, a second-step element switching-state value computing unit 26, an element switching-state selector 27, and an element switching controller 28. The element switching-state current-value decoder 21, the element switching-state target-value decoder 22, and the element switching-state difference computing unit 24 structure a setting-state comparing unit; and the first-step element switching-state value computing unit 25, the second-step element switching-state value computing unit 26, the element switching-state selector 27, and the element switching controller 28 structure an optical-switch control unit.

The element switching-state current-value decoder 21 decodes (interprets) the element-switching monitoring signal S2, and outputs a signal indicating a current setting state of each of the optical switching elements 10 (all of the optical switching elements 10) as a decoding result to the element switching-state difference computing unit 24.

The element switching-state target-value decoder 22 decodes the connection-specifying signal S1 that is a signal indicating the optical transmission channel after switching when switching the optical transmission channel, and outputs a signal indicating a setting state of each of the optical switching elements 10 after switching the optical transmission channel as a decoding result to the element switching-state difference computing unit 24. Moreover, a statement that the connection-specifying signal S1 is input, i.e., a signal indicating that a switching instruction to switch the optical transmission channel is received is output to the element switching-timing generator 23. The connection-specifying signal S1 can be information about an optical switching element included in the optical transmission channel after switching, or can be information indicating a state into which each of the optical switching elements 10 is to turn after switching (information specifying respective setting states of all of the optical switching elements 10). In the former case, notification of only identification information about the optical switching elements on the channel after switching is adequate, so that information volume to be notified can be suppressed. Moreover, information volume to be notified can be further suppressed by configuring to notify only an optical output port to be a new output destination with a connection specifying signal. In this case or the case of notifying only identification information about the optical switching elements on the channel after switching, the element switching-state target-value decoder 22 or the element switching-state difference computing unit 24 specifies the optical switching elements 10 to be included in the channel reaching a new optical output port.

The element switching-timing generator 23 (corresponding to control-timing determining unit) creates a switching timing signal of the optical switching elements 10 based on input timing of an input signal (a signal indicating that a switching instruction to switch the optical transmission channel is received) input from the element switching-state target-value decoder 22 upon receiving input of the input signal, and outputs the created signal to the element switching-state selector 27.

The element switching-state difference computing unit 24 compares a decoding result by the element switching-state current-value decoder 21 and a decoding result by the element switching-state target-value decoder 22, and outputs a comparison result to the first-step element switching-state value computing unit 25 and the second-step element switching-state value computing unit 26. Because a decoding result by the element switching-state current-value decoder 21 and a decoding result by the element switching-state target-value decoder 22 are sometimes not synchronized in timing of input in some cases; the element switching-state difference computing unit 24 stores a latest decoding result received from each decoder, and performs a comparison of decoding results each time when a decoding result is input from the element switching-state current-value decoder 21 or the element switching-state target-value decoder 22. When input timing of each decoding result is synchronized (each decoding result is input at substantially same timing), it can be configured to compare decoding results at the moment when the decoding results are input from the both of the decoder.

The first-step element switching-state value computing unit 25 determines which of the optical switching elements 10 to be switched by the processing in the first step explained in the first embodiment, based on a comparison result by the element switching-state difference computing unit 24, and outputs a determination result (a determination result #1) to the element switching-state selector 27.

The second-step element switching-state value computing unit 26 determines which of the optical switching elements 10 to be switched by the processing in the second step explained in the first embodiment, based on a comparison result by the element switching-state difference computing unit 24, and outputs a determination result (a determination result #2) to the element switching-state selector 27.

Based on the switching timing signal, the determination result #1, and the determination result #2 that are input, the element switching-state selector 27 gives a switching instruction to switch the optical switching element 10 indicated by the determination result #1 (a switching instruction #1), and a switching instruction to switch the optical switching element 10 indicated by the determination result #2 (a switching instruction #2), to the element switching controller 28.

Here, the switching instruction #2 is given at timing not to start processing corresponding to the switching instruction #2 before processing corresponding to the switching instruction #1 is completed (timing made by considering that the processing corresponding to the switching instruction #2 is to be started after the processing corresponding to the switching instruction #1 is completed). The timing can be determined by taking into account a required time for the switching processing by the optical switching element 10. Issuing timing at which the element switching-state selector 27 issues the switching instructions #1 and #2 can be each determined by the element switching-timing generator 23, and output as a switching timing signal; or only issuing timing of the switching instruction #1 can be determined by the element switching-timing generator 23, and output as a switching timing signal, and issuing timing of the switching instruction #2 can be determined by the element switching-state selector 27 based on the switching timing signal (the issuing timing of the switching instruction #1). Alternatively, a switching timing signal output by the element switching-timing generator 23 can be simply treated as a channel-switching starting-permission signal, and then the element switching-state selector 27 can determine issuing timing of the switching instructions #1 and #2 based on receiving timing of the signal.

The element switching controller 28 changes setting of the optical switching elements 10 in accordance with the switching instruction #1 and the switching instruction #2, and switches the optical transmission channel in two steps.

FIG. 7 depicts a configuration example of the switching control circuit 20 included in the optical switch according to the first embodiment, and it is configured as follows: the switching control circuit 20 included in the optical switch according to the second embodiment further includes a computing unit that determines an optical switching element to be switched by the processing in the third step based on a comparison result by the element switching-state difference computing unit 24 (a computing unit similar to the first-step element switching-state value computing unit 25 and the second-step element switching-state value computing unit 26); and in accordance with a determination result by the computing unit (a determination result #3), the element switching-state selector 27 issues a switching instruction to switch the optical switching element 10 indicated by the determination result #3.

Figure 8:
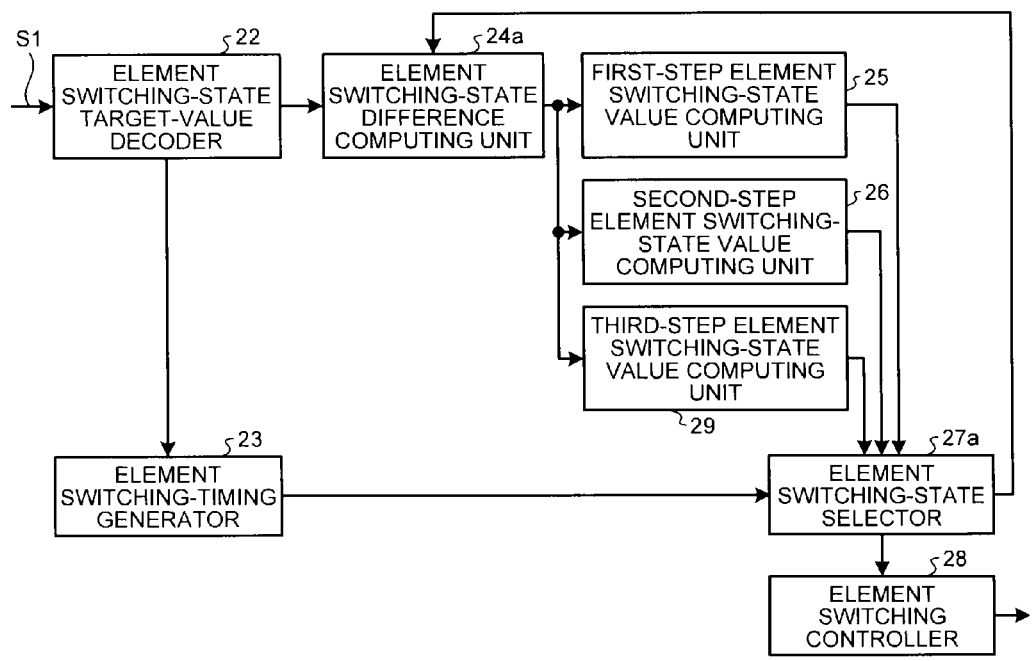
FIG. 8 is a schematic diagram that depicts a configuration example of a switching control circuit.

Moreover, the switching control circuit 20 can be configured as shown in FIG. 8. The switching control circuit 20 shown in FIG. 8 uses the connection-specifying signal S1 as an input signal from the outside, and controls each of the optical switching elements 10 based on the input signal. Furthermore, the switching control circuit 20 autonomously creates element switching timing by using the connection-specifying signal S1 as a trigger, similarly to the switching control circuit 20 shown in FIG. 7. FIG. 8 depicts an example of the switching control circuit 20 included in the optical switch explained in the second embodiment (the optical switch that switches the optical transmission channel by executing the processing in the first step, the second step, and the third step described above). In FIG. 8, the same parts as the switching control circuit 20 shown in FIG. 7 are assigned with the same reference numerals.

According to the switching control circuit shown in FIG. 8, the element switching-state current-value decoder 21 is deleted from the switching control circuit shown in FIG. 7; moreover, the element switching-state difference computing unit 24 and the element switching-state selector 27 are replaced with an element switching-state difference computing unit 24a and an element switching-state selector 27a, respectively; and furthermore, a third-step element switching-state value computing unit 29 is added.

The element switching-state difference computing unit 24a inquires of, for example, the element switching-state selector 27a a current setting state of each of the optical switching elements 10, and stores an obtained answer value (the current setting state of each of the optical switching elements 10). Moreover, when a decoding result by the element switching-state target-value decoder 22 is input, the decoding result is compared with the stored answer value. A comparison result is output to the first-step element switching-state value computing unit 25, the second-step element switching-state value computing unit 26, and the third-step element switching-state value computing unit 29. It can be configured to inquire of the element switching-state selector 27a a current setting state of each of the optical switching elements 10, when a decoding result by the element switching-state target-value decoder 22 is input. Moreover, when performing setting (switching) of the optical transmission channel, it can be configured to notify the element switching-state difference computing unit 24a from the element switching-state selector 27a of a setting state of each of the optical switching elements 10 at the moment of the setting.

The third-step element switching-state value computing unit 29 determines which of the optical switching elements 10 to be switched by the processing in the third step explained in the second embodiment, based on a comparison result by the element switching-state difference computing unit 24a, and outputs a determination result (the determination result #3) to the element switching-state selector 27a.

Based on the switching timing signal, the determination result #1, the determination result #2, and the determination result #3 that are input, the element switching-state selector 27a gives a switching instruction to switch the optical switching element 10 indicated by the determination result #1 (the switching instruction #1), a switching instruction to switch the optical switching element 10 indicated by the determination result #2 (the switching instruction #2), and a switching instruction to switch the optical switching element 10 indicated by the determination result #3 (a switching instruction #3), to the element switching controller 28. The processing corresponding to the switching instruction #3 can be started before the processing corresponding to the switching instruction #2 is completed. In other words, the element switching-state selector 27a can issue the switching instruction #3 immediately after issuing the switching instruction #2, or can issue it at the same timing as the switching instruction #2 (an switching instruction to switch the optical switching element 10 indicated by the determination result #3 can be performed with the switching instruction #2).

When the processing in the third step explained in the second embodiment is not to be performed, the third-step element switching-state value computing unit 29 shown in the figure is not needed.

Figure 9:
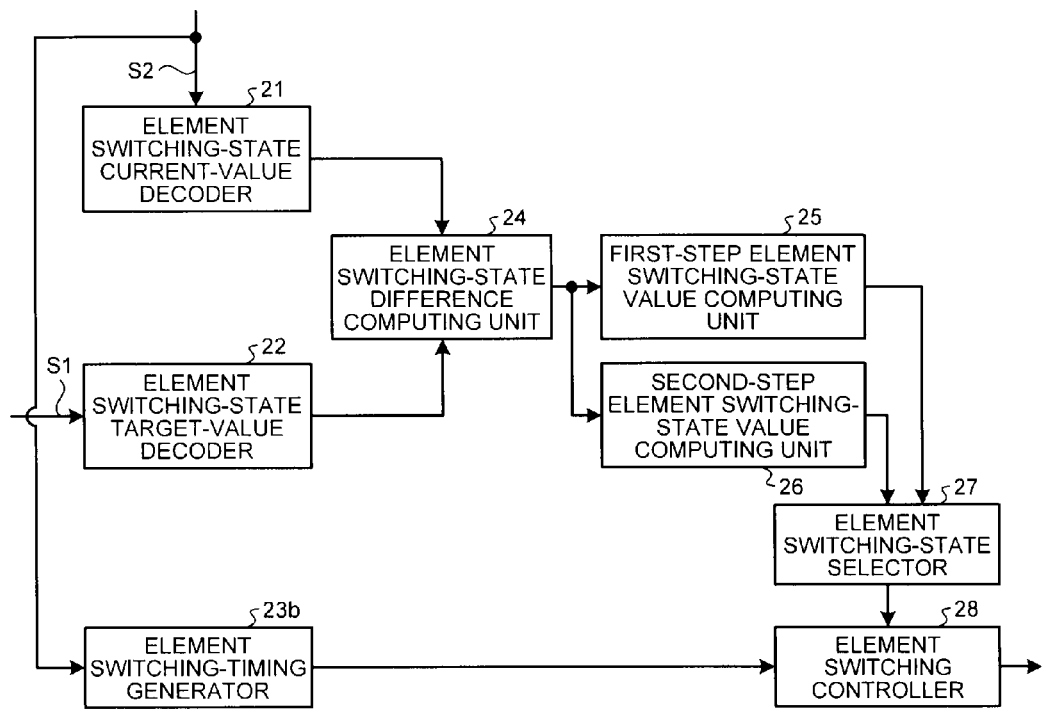
FIG. 9 is a schematic diagram that depicts a configuration example of a switching control circuit.

Moreover, the switching control circuit 20 can be configured as shown in FIG. 9. The switching control circuit 20 shown in FIG. 9 uses the connection-specifying signal S1 and the element-switching monitoring signal S2 as input signals from the outside, similarly to the switching control circuit 20 shown in FIG. 7. A difference from the switching control circuit 20 shown in FIG. 7 is part that the element switching-timing generator 23 is replaced with the element switching-timing generator 23b, and the element switching-timing generator 23b is configured to receive input of the element-switching monitoring signal S2. Accordingly, element switching timing is autonomously created by using the element-switching monitoring signal S2 as a trigger. Specifically, according to the switching control circuit 20 shown in FIG. 9, the element switching-timing generator 23b creates a switching timing signal based on input timing of the element-switching monitoring signal S2, and outputs the created signal to the element switching-state selector 27. The switching control circuit 20 shown in FIG. 9 is the same as the switching control circuit 20 shown in FIG. 7 except a point that a switching timing signal is created based on the element-switching monitoring signal S2. However, when the connection-specifying signal S1 and the element-switching monitoring signal S2 are not synchronized in timing of input, operation different from that of the switching control circuit 20 shown in FIG. 7 is needed. In such case, the element switching-timing generator 23b determines a difference between issuing timings of the switching instruction #1 and the switching instruction #2 issued by the element switching-state selector 27 (how long a time needs to elapse after issuing the switching instruction #1 until issuing the switching instruction #2), and outputs a determination result as a switching timing signal. When the determination result #1 and the determination result #2 are input, the element switching-state selector 27 then issues the switching instruction #1 and the switching instruction #2 at appropriate timing, in accordance with the difference indicated by the switching timing signal (the difference between issuing timings of the switching instruction #1 and the switching instruction #2) received from the element switching-timing generator 23b. Additionally to such timing conditions, it can be configured to satisfy timing conditions appropriate to the optical switch device according to the present invention, or a device or a system to which the optical switch according to the present invention is applied, for example, switching intervals of switching optical switching elements need to be a certain time or longer.

When also performing the processing in the third step explained in the second embodiment, a circuit equivalent to the third-step element switching-state value computing unit 29 shown in FIG. 8 can be added, and the element switching-state selector 27 can give the switching instruction #3, similarly to the element switching-state selector 27a shown in FIG. 8.

According to the switching control circuit shown in FIGS. 7 and 9, it is configured to grasp a setting state of each of the optical switching elements 10, by inputting the element-switching monitoring signal S2, and decoding the signal by the element switching-state current-value decoder 21. However, according to the optical switch described above, each of the optical switching elements 10 is switched (an output destination of an input light is set) in accordance with instruction contents specified by the connection-specifying signal S1, so that each of the optical switching elements 10 at the moment of new input of the connection-specifying signal S1 is supposed to be in a setting state corresponding to instruction contents specified by the connection-specifying signal S1 that is previously input (in a previous time). Therefore, it can be configured such that the element switching-state difference computing unit 24 can store instruction contents of the connection-specifying signal S1 that is input at latest (a latest decoding result by the element switching-state target-value decoder 22), and can compare a stored decoding result and a new decoding result each time when a new decoding result of the connection-specifying signal S1 is input from the element switching-state target-value decoder 22. In such case, the element switching-state current-value decoder 21 is not needed. The same thing can be considered in the switching control circuit 20 shown in FIG. 8. When it is configured such that the element switching-state difference computing unit 24a stores a latest decoding result by the element switching-state target-value decoder 22, feedback information from the element switching-state selector 27a to the element switching-state difference computing unit 24a (information about a current setting state of each of the optical switching elements 10) is not required.

In this way, by applying any one of the circuits shown in FIGS. 7 to 9 as the switching control circuit 20 included in the optical switch described in the first to the third embodiments, each of the optical switches described in the first to the third embodiments can autonomously create element switching timing by using the connection-specifying signal S1 or the element-switching monitoring signal S2 as a trigger.

According to the present invention, it can prevent crosstalk from occurring when switching the output destination of input light, and can achieve maintenance of confidentiality of communication contents and prevention of communication trouble occurrence.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical switch comprising:
 a multiple-stage optical-switch unit that includes one input port and a plurality of output ports that are configured by connecting multiple stages of optical switching elements each of which includes three or more optical input-output ports, and
 a switching control unit that, when receiving a switching instruction to switch an output destination of light input from the input port, executes at first a first control that changes setting of an optical switching element that is included in part not overlapping with an optical transmission channel reaching an output port before switching in an optical transmission channel reaching an output port after switching and is positioned at a point other than a branch point from an overlapping part, and then executes a second control that changes setting of an optical switching element that is positioned at the branch point
 wherein the switching control unit includes
 a setting-state comparing unit that, when receiving a switching instruction to switch an output destination of light input from an input port, compares a setting state of each optical switching element positioned in a new channel that is an optical transmission channel after changing described by the switching instruction, with a setting state of each optical switching element positioned in an old channel that is a current optical transmission channel before switching, and
 an optical switching-element control unit that specifies an optical switching element to be controlled, and performs setting change control of specified optical switching element, based on a comparison result by the setting-state comparing unit, and wherein
 the switching control unit further includes a control-timing determining unit that determines control timing of each optical switching element by using as a trigger one of reception of a connection specifying signal that indicates a switching instruction to switch an output destination of light input from an input port and reception of an element-switching monitoring signal that indicates a state confirmation result of each optical switch port, and
 the optical switching-element control unit performs setting change control of the specified optical switching element, in accordance with control timing determined by the control-timing determining unit.

2. The optical switch according to claim 1, wherein each optical switching element is connected in multiple stages by setting one of optical input-output ports to a port for input and setting rest of the optical input-output ports to ports for output, in the multiple-stage optical-switch unit.

3. The optical switch according to claim 1, wherein after the second control is executed, the switching control unit further executes a third control that sets each optical switching element not positioned in an optical transmission channel reaching an output port after changing from an input port after changing to a specific state.

4. An optical-switch control method when changing an output destination of input light by an optical switch that includes one input port and a plurality of output ports that are configured by connecting multiple stages of optical switching elements each of which includes three or more optical input-output ports, the optical-switch control method comprising:

comparing a first optical transmission channel reaching a current output port from an input port with a second optical transmission channel reaching a new output port after changing from the input port, when receiving a switching instruction to switch an output destination of light input from the input port; and controlling optical switching elements by executing a first control that changes setting of an optical switching element that is included in part not overlapping with the first optical transmission channel in the second optical transmission channel based on a comparison result by the comparing, and is positioned at a point other than a branch point from an overlapping part, and then executing a second control that changes setting of an optical switching element that is positioned at the branch point; and determining control timing of each optical switching element by using as a trigger one of reception of a connection specifying signal that indicates a switching instruction to switch an output destination of light input from an input port and reception of an element-switching monitoring signal that indicates a state confirmation result of each optical switch port, wherein the controlling of optical switching elements performing setting change control of a specified optical switching element in accordance with the control timing determined by the determining.

5. The optical-switch control method according to claim 4, wherein after executing the second control, the controlling further executing a third control that sets each optical switching element not positioned in the second optical transmission channel to a specific state.

* * * * *